United States Patent [19]
Crandall

[11] Patent Number: 5,616,901
[45] Date of Patent: Apr. 1, 1997

[54] ACCESSIBLE AUTOMATIC TELLER MACHINES FOR SIGHT-IMPAIRED PERSONS AND PRINT-DISABLED PERSONS

[75] Inventor: William Crandall, San Francisco, Calif.

[73] Assignee: Talking Signs, Inc., Baton Rouge, La.

[21] Appl. No.: 574,555

[22] Filed: Dec. 19, 1995

[51] Int. Cl.$^6$ ............................ G06F 17/60; G09B 21/00
[52] U.S. Cl. ............................................ 235/379; 434/112
[58] Field of Search ................................ 235/379, 380, 235/362, 381; 340/407, 825.49; 902/10, 20, 25; 434/112, 113; 404/42, 10

[56] References Cited

U.S. PATENT DOCUMENTS

| | | | |
|---|---|---|---|
| 4,253,083 | 2/1981 | Imamura | 340/44 |
| 4,660,022 | 4/1987 | Osaka | 340/407 |
| 5,032,836 | 7/1991 | Ono et al. | 340/825.71 |
| 5,144,294 | 9/1992 | Alonzi et al. | 340/825.49 |
| 5,241,307 | 8/1993 | Bidault et al. | 340/944 |
| 5,284,444 | 2/1994 | Raynes | 434/113 |
| 5,417,574 | 5/1995 | Raynes | 434/112 |
| 5,487,669 | 1/1996 | Kelk | 434/112 |

Primary Examiner—Donald T. Hajec
Assistant Examiner—Thien Minh Le
Attorney, Agent, or Firm—John F. Sieberth

[57] ABSTRACT

Systems which comprise (a) an automatic teller machine which includes a plurality of customer interfaces such as a bank card reader, a banking record dispenser, a cash dispenser, and a receptacle for receiving bank deposits; (b) infrared remote communication emitters and (c) individual short range infrared communication emitters located in the teller machine. The emitters (b) are adapted to provide repeating, directionally sensitive frequency modulated message signals identifying the direction to and location of the teller machine. Thus a person having a portable receiver for such signals is led to the machine and is enabled to position himself/herself in front of the machine in order to operate it. The respective emitters of (c) provide a separate repeating, directionally sensitive frequency modulated message signal which at least identifies the location of the respective customer interfaces on the teller machine so that by movement of the portable receiver in front of the machine, the location on the teller machine of the respective customer interfaces can be determined. Feedback concerning the transactions can also be provided from the system to the customer through the portable receiver.

13 Claims, 2 Drawing Sheets

ACCESSIBLE AUTOMATIC TELLER MACHINES FOR SIGHT-IMPAIRED PERSONS AND PRINT-DISABLED PERSONS

TECHNICAL FIELD

This invention relates to automatic teller systems rendered accessible for sight-impaired persons and print-disabled persons.

BACKGROUND

A recent analysis of the National Center for Health Statistics estimated that 4.3 million non-institutionalized people in the United States had difficulty reading the newspaper with their corrected vision—a functional definition of perceived limitations termed "Severe Visual Impairment" (Nelson and Dimitrova, JVIP, March, 1993). An additional 2.3 million people also reported difficulty with seeing medium to far distances. Another recent study (Chiang, et. al, *Milbank Quarterly*, 1992) estimates 1.1 million people are legally blind under the definition of tested acuity (<20/200). Many other disabilities prevent persons from reading print. In addition to people who are blind or have low vision and may not be able to see the print, there are many stroke, head-injured, autistic and dyslexic (or even just educationally impaired) persons who may not be able to assimilate printed language even though they can see the page. Many people can accept this information through speech.

In recent years an information and wayfinding system has been developed for assisting blind, low-visioned and otherwise print-handicapped individuals. The system, marketed under the trademark Talking Signs, consists of infrared transmitters and receivers. Transmitters are placed on key signs in the environment which continually transmit the message of the sign. The receiver is carried by the person who activates it when direction or information is desired.

A widely-used, highly popular method of conducting banking transactions involves use of automatic teller machines, commonly referred to as ATMs. Unfortunately, heretofore ATMs have had extremely limited accessibility for sight-impaired persons and print-disabled persons. Even if an ATM were to be provided with tactile displays, such as instructions in braille, the individual would have to be at the location of the ATM before the person could identify the information it bears. Moreover, the person would have to search for the location of such displays and the location of the relevant customer interacting means of the ATM, such as the bank card reader, the banking record dispenser, the cash dispenser, and slot or other mechanism for receiving bank deposits. And in addition, even after making use of the ATM the person would have to make the assumption that the desired banking functions were in fact accomplished. No positive on-the-spot reassuring feedback is available to the sight-impaired person or the print-disabled person.

A need thus exists for an effective way by which an ATM can be rendered accessible and user-friendly to sight-impaired persons and to print-disabled persons, without in any way diminishing the utility of the ATM for persons who are not sight-impaired or print-disabled. In fulfilling this need, it is also highly important not to interfere with the operation of the ATM, or necessitate major or costly modification of the ATM apparatus. This invention is deemed to fulfill this need and to satisfy these requirements in a highly effective and efficient manner.

SUMMARY OF THE INVENTION

The present solution to the problem of providing accessible, user-friendly electronic banking terminals for use by sight-impaired persons and by print-disabled persons approaches the problem at various interrelated levels—each level going technically deeper into the system. The first level or step provides an effective way to identify the existence of and location of the teller machine. At the second level there is provided an information output mechanism to the customer appropriate to the customer's needs, once the customer has located the teller machine. And at the third level, there is provided an information input mechanism from the customer and an information output to the customer, both appropriate to the customer's abilities.

In one of its embodiments this invention provides an automatic teller system rendered accessible for sight-impaired persons and print-disabled persons, which system comprises: (a) an automatic teller machine which includes customer interacting means such as, for example, a bank card reader, a banking record dispenser, a cash dispenser, means for receiving bank deposits, etc.; (b) infrared remote communication means providing repeating, directionally sensitive frequency modulated message signals identifying the direction to and location of the teller machine such that a person having a portable receiver for said signals is led to and enabled to position himself/herself in a proximate operative relationship with the teller machine; and (c) individual short range infrared communication means in the teller machine, each said short range infrared communication means providing at least a separate repeating, directionally sensitive frequency modulated message signal identifying the location of the respective customer interacting means on the teller machine such that said person can by suitable movement of such portable receiver in proximity to the teller machine identify the location on the teller machine of the respective customer interacting means. In addition the systems of this invention preferably also include short range infrared interactive communication means in the teller machine providing frequency modulated message signals for conveying transaction information to the receiver of the person while located in an operative relationship with the teller machine. The transaction information can at least in part be transmitted in response to use or actuation by the person of respective customer interacting means of the ATM and thereby serve as positive feedback to the person operating the ATM. Using the principles of this invention, still other types of interactive communication can be programmed into the system to provide other information to the customer on request, such as account balance information, current interest rates, and so forth.

Item (a) above can be any type of ATM which enables the user to conduct banking transactions such as withdrawal of money from one's account or depositing money to one's account. Devices of this type are in widespread use and thus further description is deemed unnecessary. Without in any way limiting the scope of this invention to any particular type of ATM, one interested in descriptions of devices of this type may refer, for example, to U.S. Pat. No. 4,314,352 to H. D. Fought; U.S. Pat. No. 4,318,354 to L. A. Fish; U.S. Pat. No. 5,382,777 to T. Yuhara et at., and references cited therein.

Infrared remote communication means (b) above is/are particularly appropriate for open spaces where tactile signs are inappropriate; they label the environment for distant viewing. Such means operate in a "broadcast" mode and allow sight-disabled or print-impaired people to directly know not only what the item is, but where the item is. Just as sighted persons visually scan the environment to acquire both label and direction information, means (b) above directly orients the person to the labeled goal and constantly updates the person as to progress to that goal. That is, unlike Braille, raised letters, or voice signs which passively label some location or give mobility instructions to some goal, infrared means (b) above, which typically is in the form of an array of infrared emitters, provides a repeating, directionally selective voice message or a series of such messages at least one of which originates at the location of the ATM and others of which may emanate from places leading to that location. All such messages are transmitted to a hand-held receiver. The direction selectivity is a characteristic of the infrared message beam and ensures that the person using the device gets constant feedback about his or her relative location to the goal as she or he moves towards it.

Means (c) above enables the customer, when suitably positioned relative to the ATM—usually directly in front of it and close enough to operate the customer interacting means thereof, such as a bank card reader, a banking record dispenser, a cash dispenser, and a receptacle or slot for receiving bank deposits—to first locate the precise position of the customer interacting means and then to perform the desired functions. To locate the precise position of the customer interacting means the customer need only slowly sweep the receiver across the face of the ATM. As the beam of each infrared emitter is encountered it communicates to the receiver and thence to the customer not only what customer interacting means is at, or in close proximity to, the source of that infrared signal, but precisely where that customer interacting means is located on the ATM. Indeed, by moving the receiver to trace the signal beam back to the surface of the teller machine, the customer can then manually touch and learn the configuration of the interacting means. The signal can also be programmed to give instructions on how to operate that particular customer interacting means and in what direction to move the receiver to find the other customer interacting means that the customer may wish to find. Means (c) can also be programmed to provide feedback to the customer to confirm the extent, nature and/or completion of the transaction. Alternatively, separate means (d) can be included in the system for providing such feedback and, to whatever extent desired, other forms of interaction with the customer.

The system thus conveys transaction information to the receiver of the customer as the customer conducts the selected operations made possible by the ATM. For example, the means of (c) or (d) can be programmed to inform the customer whether the proper PIN code has been entered and that subsequent entries to the ATM are operating under the desired menus by virtue of proper key presses and properly synchronized responses to such key presses. Similarly, if the amount of a cash withdrawal requested exceeds the account balance, the signal from means (c) (or (d) if used) can be programmed to inform the customer of the situation, what account balance is available for withdrawal, and what can be done under the circumstances, and how to proceed with the approach the customer elects to pursue (e.g., proceed with a more limited permissible cash withdrawal or cancel the entire proposed transaction).

Means of (c) and (d) above typically operate in a "narrowcast" mode can be arranged to emanate from the same or different infrared emitters. The emitters and the electronics associated therewith are preferably placed within the cabinet or housing of the ATM. In this way the system is rendered vandal-resistant and inconspicuous to sighted individuals.

The infrared transmitters themselves are relatively small physically. For example, a 4×4 inch circuit board can readily accommodate the speech, clock and infrared LED driver circuits. In preferred arrangements the infrared emitters are placed in or immediately behind small apertures (e.g., 0.125 inch diameter) in the front face or panel of the ATM or in small bezels attached to and through the front face or panel of the ATM. A preferred bezel is disclosed in commonly-assigned U.S. patent applications Ser. Nos. 08/539,358, and 29/044,997, both filed Oct. 5, 1995, the disclosures of which are incorporated herein in total by reference for all purposes. An advantage of all such arrangements is that not only are the infrared signals easily detected by the customer's receiver but the customer's body serves as a light shield to ensure that only the customer's receiver would pick up the transaction information.

In all cases, the infrared signals utilized in the systems of this invention are picked up by a portable directional receiver which typically comprises (i) a non-visual communicator such as a small audio speaker or small audio earphone system, (ii) a self-contained source of electrical energy, (iii) a detector for receiving a sensed continuous frequency modulated infrared signal, and (iv) electronics converting the sensed signal into intelligible non-visual communication emanating from the communicator. Suitable receivers are available from Talking Signs, Inc., Baton Rouge, La., and information concerning such devices has been published. A particularly preferred portable directional receiver for such use is described in detail in commonly-assigned co-pending application Ser. No. 08/496,970, filed Jun. 30, 1995, all disclosure of which is incorporated herein by reference for all purposes. The receiver therein described has the advantage, inter alia, of giving good performance even when the receiver is in use in the presence of an ambient background of light energy.

DESCRIPTION OF PREFERRED EMBODIMENTS

As noted above, automatic teller machines per se are well known and, standing alone, form no part of this invention. Likewise a remote infrared information and wayfinding system has been developed and is available for use as the infrared remote communication means (b) above. These systems are marketed under the trademark Talking Signs by Talking Signs, Inc., Baton Rouge, La., and further information concerning such systems can be found, for example, in a book published by The Smith-Kettlewell Eye Research Institute (San Francisco, Calif.) entitled Remote Signage for the Blind and Print Handicapped. Although standing alone neither means (a) nor means (b) above is novel per se, so far as is known, the combination of means (a) and means (b) is itself novel.

Figure 1:
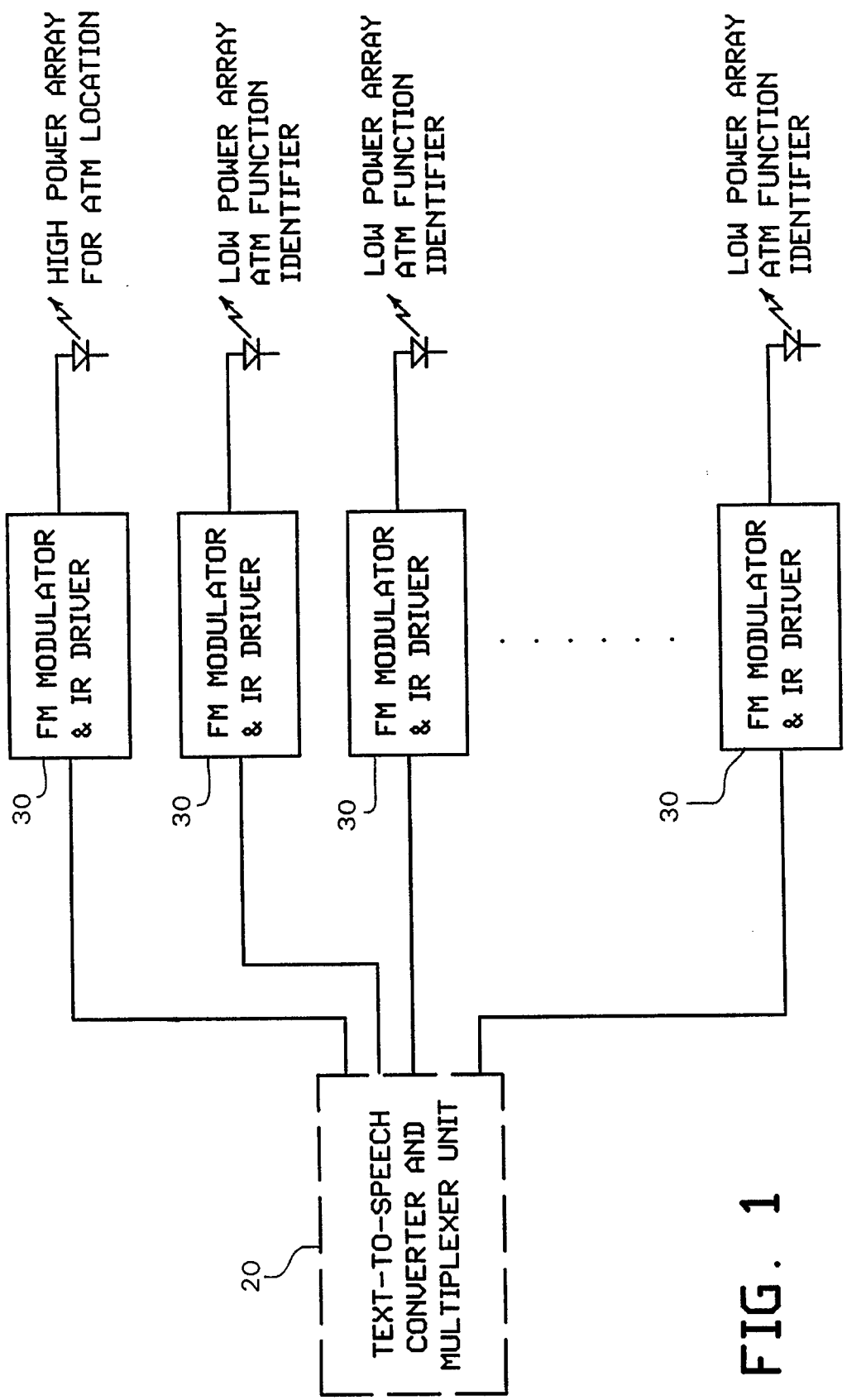
FIG. 1 is a block diagram illustrating a typical system for installation in an automatic teller machine to serve both as one of the individual long range infrared communication means (b) above and as a plurality of short range infrared communication means (c) above (and (d) above, if used as separate means).

Turning now to the system in the form depicted in FIG. 1, output from TEXT-TO-SPEECH CONVERTER AND MULTIPLEXER UNIT 20 is received and processed by a plurality of FM MODULATOR & IR DRIVERS 30, the respective outputs from which are emitted by suitably powered arrays of single channel emitters each of which delivers a continuous frequency modulated infrared signal. In FIG. 1 the array serving as means (b) above is the referred to as the "HIGH POWER ARRAY FOR ATM LOCATION". Each individual means (c) (and means (d), if used separately) is referred to in FIG. 1 as "LOW POWER ARRAY FOR ATM FUNCTION IDENTIFIER". Any suitable number of such high and low power arrays and their respective modulators and drivers 30 can be provided as deemed necessary or appropriate for any given ATM installation.

The individual high and low power arrays serving respectively as the remote communication means (b), and the short range infrared locator communication means (c) (and (d) if used separately) typically comprise an array of single channel emitters each of which delivers a continuous frequency modulated infrared signal in the pattern of a cone having a beam width in the range of about 10° to about 50° at a modulated frequency of 25 KHz with a 6 KHz band width and having an infrared carrier frequency in the range of 850 to 950 nanometers. A principal difference between the high and low power arrays resides in the excitation power to the diode. Also, depending on the size of the teller machine, the cone beam width of the individual low power arrays may be narrower than that of a high power array. Text-to-speech converter and multiplexer units 20 are available as articles of commerce.

Figure 2:
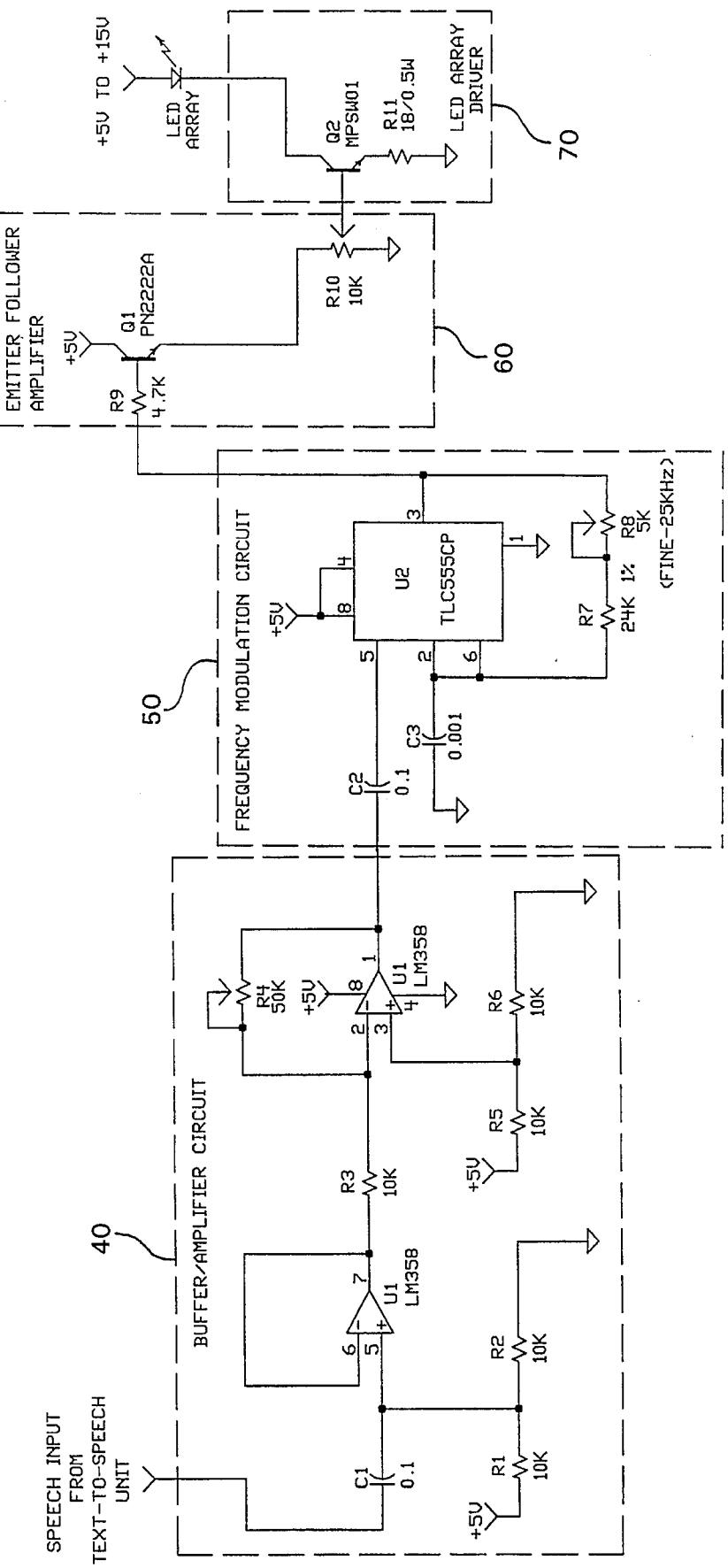
FIG. 2 is a circuit diagram for a typical frequency modulation circuit and associated infrared driver network for use in a system of FIG. 1.

FIG. 2 illustrates the electronics and circuitry for generating the infrared signal for transmission by an array composed of one or more infrared LEDs in a series configuration. As shown in FIG. 2, the system processing the output signal from the text-to-speech unit for ultimate transmission via the infrared emitters comprises a buffer/amplifier circuit 40, a frequency modulation circuit 50, an emitter follower amplifier 60, and an LED array driver 70, the respective components of which are set forth in FIG. 2 itself. As can be seen from FIG. 2, the analog signal from the text-to-speech unit is input to the buffer amplifier circuit of U1 via capacitor C1. The gain is determined by the value of potentiometer R4, adjustable for gains from 0 to 5. The output signal from buffer/amplifier circuit 40 is directed to the frequency modulation circuit of U2 via capacitor C2. Frequency modulation circuit 50 converts the amplified analog voltage signal from circuit 40 into a frequency modulated signal centered at a carrier frequency of 25 KHz. The carrier frequency is set by adjustment of potentiometer R8. The frequency modulated output from circuit 50 is transferred to the emitter follower amplifier of transistor Q1 via resistor R9. The potentiometer R10 of amplifier 60 is used to excite the base of the LED array driver of Q2. The resistor R11 of LED array driver 70 is selected to limit the current flowing in the collector circuit containing the LED array (composed of one or more infrared LEDs in a series configuration) to prevent damage to the array due to excessive current flow. The power supply to the LED array is in the voltage range from +5 VDC to +15 VDC.

As noted above, the infrared remote communication means (b) above operate(s) in a "broadcast" mode whereas the short range infrared communication means operate in a "narrowcast" mode. This differentiation can be readily accomplished by regulating the excitation power to the respective emitter diodes. Thus typically the excitation power to the diode of means (b) above will be in the range of at least about 10 milliwatts up to about 1000 milliwatts, whereas the "narrowcast" operation of the short range diodes such as means (c) is typically effected by use of excitation power in the range of about 1 to about 10 milliwatts. In will be understood and appreciated, however, that departures from these ranges may be made whenever deemed necessary or desirable in any given situation, and such departures are within the ambit of this invention.

The instructions and information programmed into the systems for transmission to the customer via the infrared signals is preferably in universal ASCII format, but can be in the form of a binary code that provides for a voice message equivalence. Preferably, the voice message equivalence is digitally recorded natural speech. However, the voice message equivalence can be synthesized speech, if desired.

In one of its variant forms, this invention provides a control box to be used by the disabled person in conducting transactions with the ATM, once such person has been led by the system to a suitable location proximate to the ATM. If the customer is a Braille-reading person, the control box has labelled buttons and a Braille display of electromechanical pins with which all commands are transmitted to the ATM of a system of this invention and with which all feedback from such ATM are received by the person via tactile communication. In the case of a severely disabled person requiring a joystick or chin operated controls, the control box is appropriately configured for use by the disabled person in actuating the ATM system by means of the control box. In such case the control box is configured to receive the feedback in whatever manner is necessary or appropriate given the nature of the disablement.

The entire disclosure of each and every U.S. patent and of each and every journal article, book or other publication of any kind, referred to in any portion of this specification is incorporated herein by reference for all purposes.

This invention is susceptible to considerable variation in its practice. Therefore the foregoing description is not intended to limit, and should not be construed as limiting, the invention to the particular forms of the invention described with reference to the Drawings. Rather, what is intended to be covered is as set forth in the ensuing claims and the equivalents thereof permitted as a matter of law.

I claim:

1. An automatic teller system rendered accessible for sight-impaired persons and print-disabled persons, which system comprises:

a) an automatic teller machine which includes a plurality of customer interacting means;

b) infrared remote communication means providing repeating, directionally sensitive frequency modulated message signals identifying the direction to and location of the teller machine such that a person having a portable receiver for said signals is led to and enabled to position himself/herself in a proximate operative relationship with the teller machine; and c) individual short range infrared communication means in the teller machine, each said short range infrared communication means providing a separate repeating, directionally sensitive frequency modulated message signal which at least identifies the location of the respective customer interacting means on the teller machine such that said person can by movement of such portable receiver identify the location on the teller machine of the respective customer interacting means thereof.

2. A system of claim 1 wherein said short range infrared communication means in the teller machine also provide frequency modulated message signals for conveying transaction information to the receiver of said person while located in an operative relationship with the teller machine, said information being in response to actions taken by the person using one or more of said customer interacting means.

3. A system of claim 1 wherein said customer interacting means comprise a bank card reader, a banking record dispenser, a cash dispenser, and means for receiving bank deposits.

4. A system of claim 1 wherein said infrared remote communication means and said individual short range infrared communication means comprise separate arrays of single channel emitters each of which delivers a continuous frequency modulated infrared signal in the pattern of a cone having a beam width in the range of about 10° to about 50° at a modulated frequency of 25 KHz with a 6 KHz band width and having an infrared carrier frequency in the range of 850 to 950 nanometers, said remote communication means being operated at a higher power input than said short range infrared communication means.

5. A system of claim 4 wherein said customer interacting means comprise a bank card reader, a banking record dispenser, a cash dispenser, and means for receiving bank deposits.

6. A system of claim 4 wherein said system further comprises separate short range infrared communication means in the teller machine to provide frequency modulated message signals for conveying transaction information to the receiver of said person while located in an operative relationship with the teller machine, said information being in response to actions taken by the person using one or more of said customer interacting means.

7. An automatic teller system rendered accessible for sight-impaired persons and print-disabled persons, which system comprises:

a) an automatic teller machine which includes as customer interacting means thereof, a bank card reader, a banking record dispenser, a cash dispenser, and means for receiving bank deposits;

b) one or more infrared remote communication means providing repeating, directionally sensitive frequency modulated message signals identifying the direction to and location of the teller machine such that a person having a portable receiver for said signals is led to and enabled to position himself/herself in a proximate operative relationship with the teller machine;

c) individual short range infrared locator communication means in the teller machine, each said short range infrared locator communication means providing a separate repeating, directionally sensitive frequency modulated message signal which at least identifies and leads to the location on the teller machine of the respective customer interacting means such that said person can by movement of such portable receiver identify the location of the respective customer interacting means; and d) one or more short range infrared interactive communication means in the teller machine providing frequency modulated message signals for conveying transaction information to the receiver of said person while located in an operative relationship with the teller machine.

8. A system of claim 7 wherein said remote communication means comprises an array of single channel emitters each of which delivers a continuous frequency modulated infrared signal in the pattern of a cone having a beam width in the range of about 10° to about 50° at a modulated frequency of 25 KHz with a 6 KHz band width and having an infrared carrier frequency in the range of 850 to 950 nanometers.

9. A system of claim 7 wherein each said short range infrared locator communication means comprises at least one single channel emitter which delivers a continuous frequency modulated infrared signal in the pattern of a cone having a beam width in the range of about 10° to about 50° at a modulated frequency of 25 KHz with a 6 KHz band width and having an infrared carrier frequency in the range of 850 to 950 nanometers.

10. A system of claim 7 wherein said short range infrared interactive communication means comprises at least one single channel emitter which delivers a continuous frequency modulated infrared signal in the pattern of a cone having a beam width in the range of about 10° to about 50° at a modulated frequency of 25 KHz with a 6 KHz band width and having an infrared carrier frequency in the range of 850 to 950 nanometers.

11. A system of claim 7 wherein the instructions and information programmed into at least (i) said short range infrared locator communication means and (ii) said short range infrared interactive communication means is either in universal ASCII format or a binary code that provides for a voice message equivalence.

12. A system of claim 11 wherein the voice message equivalence is digitally recorded natural speech.

13. A system of claim 11 wherein the voice message equivalence is synthesized speech.

* * * * *

UNITED STATES PATENT AND TRADEMARK OFFICE
CERTIFICATE OF CORRECTION

PATENT NO. : 5,616,901
DATED : April 1, 1997
INVENTOR(S) : William F. Crandall, Jr.

It is certified that error appears in the above-identified patent and that said Letters Patent is hereby corrected as shown below:

On the title page, below "United States Patent [19]", the word "Crandall" should read -- Crandall, Jr. --.

On the title page, after "[75] Inventor:", "William Crandall" should read -- William F. Crandall, Jr. --.

Signed and Sealed this

Eighth Day of July, 1997

*Attest:*

BRUCE LEHMAN

*Attesting Officer*     *Commissioner of Patents and Trademarks*